Patented Dec. 23, 1930

1,786,016

UNITED STATES PATENT OFFICE

JACOB S. MASIN AND HAROLD E. WHITE, OF ANNISTON, ALABAMA, ASSIGNORS, BY MESNE ASSIGNMENTS, TO SWANN RESEARCH, INC., OF BIRMINGHAM, ALABAMA, A CORPORATION OF ALABAMA

METHOD FOR THE PRODUCTION OF HIGH-PURITY ABRASIVE MATERIALS

No Drawing.   Application filed May 9, 1927.   Serial No. 190,131.

This invention relates to a high purity abrasive material, and a method for its production.

It has for its object the purifying of aluminous materials, not necessarily of high purity, such as bauxite, and the production of high purity crystalline aluminous oxide therefrom, suitable for abrasive purposes, in a manner not possible heretofore; and at a cost substantially less than those methods at present employed to produce a material of a purity comparable with that described in this application.

This high purity crystalline aluminous oxide is chiefly used in the manufacture of grinding wheels where precision work is required. It is preferred to the ordinary type of abrasive material for this character of work, because the higher purity abrasive breaks down more freely and thereby exposes new cutting edges; whereas the lower purity abrasive is more resistant to particle fracture on impact.

At present there are two general classes of artificial crystalline aluminous oxide used in abrasive work, and particularly in grinding wheels. One contains from 93 to 96% $Al_2O_3$; is usually of a dark red color, and is used principally for heavy work. The other class is made by melting purified alumina, and the resultant product contains approximately 98 to 99.5% $Al_2O_3$. It is usually white or light gray in color and is not as tough as the dark red material. The former material is used in grinding wheels where greater toughness is required while the latter material is desired for its physical and chemical uniformity and greater friability.

The need for a high purity aluminous oxide for abrasive purposes, has long been recognized, and numerous attempts have been made to produce such a material covering a wide variety of methods, as for instance, furnacing a mixture of corundum and bauxite with coke; the use of addition agents to a bauxite burden to volatilize the impurities; partial reduction and re-fusing; and over reducing and then oxydizing by a second heating with oxydizing agents; however, the most satisfactory, and so far as we are aware the only commercially successful process melts purified alumina, then cools and forms crystalline alumina. This is obviously an expensive process because the treatment of bauxite to make the purified alumina used is recognized as an expensive process.

The production of high purity crystalline aluminous oxide abrasive directly from commercial bauxite has been attempted for many years. This has been undertaken because of the economic advantage of the use of bauxite instead of purified alumina. Such a method consisting of furnacing bauxite or like aluminous material and coke or like carbonaceous material and subsequently treating the crystalline mass is the subject of our invention and by it we are enabled economically to produce a high purity abrasive material suitable for precision grinding wheels.

In order to make clear the difference between our process and those which have been proposed for the production of high purity crystalline aluminous oxide abrasive, we will now describe the methods commonly used to produce aluminous oxide, and will then describe the process which we propose.

In the production of what is called "regular aluminous oxide or abrasive" by the trade, the charge, comprising bauxite and coke, and in case the iron content of the bauxite is low, steel borings, is smelted in an electric furnace.

A typical analysis of a bauxite suitable for such purposes is:

|   | Per cent |
|---|---|
| $Al_2O_3$ | 83.8 |
| $SiO_2$ | 6.6 |
| $Fe_2O_3$ | 5.6 |
| $TiO_2$ | 3.5 |
| Ign. loss | 0.5 |

Employing such a bauxite for the production of 94 to 96% $Al_2O_3$ according to present practice the charge would comprise:

100 lbs. bauxite
4 lbs. carbon

While it would seem practicable to add enough carbon calculated to completely reduce all the oxides of the accompanying impurities, viz., silica, iron oxide, and titanium oxide, in actual practice this is not advisable, if the toughness desired is to be obtained for this type of abrasive, and accordingly a carbon deduction is made depending on the impurities desired in the resultant crystalline aluminous oxide. If the theoretical carbon requirement is used for the reduction of the oxide impurities the product ordinarily will partially or wholly disintegrate when exposed to the air, and is therefore in this condition not a product suitable for use in the manufacture of grinding wheels.

A majority of the reduced oxides form a metallic alloy of iron-silicon-titanium which settles to the bottom of the ingot. A small percentage of silica and iron, and a larger percentage of titanium is not reduced and removed with the alloy; and these unreduced compounds probably with some of the alumina produce a glassy-like matrix, surrounding the crystals of $Al_2O_3$ which form when the ingot cools.

The purified alumina which is used for the production of 98 to 99% crystalline $Al_2O_3$, has a composition of which the following is typical:

|  | Per cent |
|---|---|
| Ign. loss | 0.5 |
| $SiO_2$ | 0.2 |
| $Fe_2O_3$ | Tr. |
| CaO | None |
| MgO | 0.01 |
| $TiO_2$ | None |
| $Al_2O_3$ | 97.79 |
| Alkalies | 1.5 |

When a purified alumina of the above typical analysis is melted and cooled, the product is of the following approximate composition:

|  | Per cent |
|---|---|
| $SiO_2$ | 0.3 |
| $Fe_2O_3$ | 0.1 |
| TiO | None |
| Alkalies | 1.0 |
| MgO | 0.02 |
| $Al_2O_3$ | 98.58 |

The silica and iron increase is due partially to increase in concentration on furnacing, and ash from the electrodes. The alkali loss is due to volatilization during furnacing.

In our process for the production of high purity crystalline aluminous oxide abrasive, we seek to produce a condition of the matrix heretofore regarded objectionable and requiring subsequent fusion steps, i. e., we deliberately form a matrix readily decomposable by certain acid solutions, and then remove the matrix from around and between the crystals of alumina by means of mixtures of acid solutions such as sulfuric acid and hydrofluoric acid. To obtain this readily decomposable matrix we add more carbon than the theoretical requirement to reduce substantially all of the oxides of silicon, iron and titanium of the charge. By the reduction of these oxides, and a small percentage of the alumina, decomposable products are formed and produce the matrix which surrounds the crystals of alumina like the glassy-like matrix in the case previously referred to, when lesser quantities of carbon are used. We have found that refuse material from regular operations, as magnetic grain with adhering abrasive may be satisfactorily used instead of bauxite.

In case a bauxite of the previously mentioned analysis is used for the production of high purity crystalline aluminous oxide according to our process, the charge would comprise:

100 lbs. bauxite
9 lbs. carbon

The charge is furnaced so that complete fusion takes place and time is allowed for the carbon to reduce the oxides previously mentioned, and for the alloy to settle to the bottom of the melt. An ingot type furnace as commonly used for abrasive production is suitable for this operation. We believe these readily decomposable products formed between the alumina crystals are largely carbides; however, it is not definitely known, and regardless of the compounds formed the production of a matrix readily decomposable or removable, and its removal from the crystals satisfies the method we employ.

After the melt cools and solidifies, it is broken into lump form, when the refuse pieces of alloy and other material not suitably reduced are picked out. The lumps are then crushed to sizes of 20 mesh and finer, and passed over a magnetic separator to remove particles of the iron-silicon-titanium alloy which were not removed by the picking operation. From the magnetic separator the grain is passed to a roaster where it is heated to a red heat, whereby any adhering carbon is burned off. It has also been found that this roasting aids in breaking up the crystal aggregates. Following the roasting, the grain is subjected to a chemical treatment in accordance with the procedure outlined in co-pending U. S. patent application, Serial No. 34,179, filed by Jacob S. Masin, wherein a method of treating crushed aluminous abrasive material is described by which the impurities between or adhering to the abrasive grains or crystals were removed by an acid treatment such as by a bath of sulfuric acid and hydrofluoric acid or of hydrochloric acid and hydrofluoric acid, or by the use of hydrofluoric acid gas when passed over the surfaces of the grain while moistened with sulfuric or hydrochloric acid, or fluorides may be mixed with the grain so that hydrofluoric acid will be liberated by the action of another acid such as sulfuric acid. As illustrative of an acid bath treatment, a lot of graded abrasive is placed in a lead vat containing a bath composed of a mixture of approximately 6% hydrofluoric and 16% sulfuric acid and the grain is covered with the mixture and allowed to stand twenty-four hours. It has been found preferable to warm the acid and grain during the treatment, to facilitate reaction of the acids on the decomposable product. The grain is removed from the treating apparatus and washed with water until all the acid and salts are removed. It is then dried, and screened into sizes in a manner similar to that employed in the production of all other types of abrasive. The finished grain contains from 98 to 99.5% $Al_2O_3$, and is substantially free of fluxing impurities, and is practically white in the finer sizes, with a light gray color in the coarser sizes.

Where we have used the term "bauxite" in the specification and claims, we intend thereby to include any alumina bearing material containing sufficient impurities to form, with the excess of carbon in the charge, the readily dissoluble matrix for the crystals of $Al_2O_3$.

Having thus described our invention, what we claim as new and desire to secure by Letters Patent, is:—

1. A process for the direct production of high purity crystals of aluminous oxide from bauxite, which consists in smelting the bauxite in the presence of sufficient carbon to produce an acid-decomposable matrix in which the crystals of high purity crystalline aluminous oxide are formed, dissolving the matrix in a bath containing dilute sulphuric acid, and separating the crystals therefrom.

2. A process for the production of a high purity abrasive material, which consists in furnacing a charge of bauxite with an excess of carbon to reduce substantially all the oxides of silicon, iron, titanium and a small percentage of alumina present in the bauxite, then cooling said fused mass and forming a high purity crystalline alumina imbedded in a matrix of acid-decomposable character, said character being the result of the excess of said carbon in the charge, then crushing and separating undesirable portions of the fused mass, and then subjecting said crushed material to the dissolving action of a bath of dilute sulphuric and hydrofluoric acids.

3. A process for the production of a high purity abrasive material, which consists in furnacing a charge of bauxite with an excess of carbon to reduce substantially all the oxides of silicon, iron, titanium and a small percentage of alumina, then cooling said fused mass and forming crystals of approximately 99% $Al_2O_3$ imbedded in a matrix of acid-decomposable character, said character being a result of the excess of said carbon in the charge, then crushing and separating undesirable portions of the fused mass, and then subjecting the residue of such material to the dissolving action of a bath of dilute sulphuric and hydrofluoric acids.

4. A process for the production of a high purity abrasive material, which consists in furnacing a charge of bauxite with an excess of carbon to reduce substantially all the oxides of silicon, iron, titanium and a small percentage of alumina, then cooling said fused mass and forming a high purity crystalline alumina imbedded in a matrix of acid-decomposable character, said character being a result of the excess of said carbon in the charge, then crushing and separating aluminous oxide from the fused mass, then heating said crushed aluminous oxide grain to a red heat, and then subjecting said crushed grain to the dissolving action of a bath containing dilute sulphuric and hydrofluoric acids.

5. A process for the production of a high purity abrasive material, which consists in furnacing a charge of bauxite with an excess of carbon to reduce substantially all the oxides of silicon, iron, titanium and a small percentage of alumina, then cooling said fused mass and forming a high purity crystalline alumina imbedded in a matrix of acid-decomposable character, said character being a result of the excess of said carbon in the charge, then crushing and separating granular crystalline alumina from the fused mass, then heating said crushed grain to a red heat, then subjecting said grain to the dissolving action of a bath of mixed hydrofluoric and sulphuric acids, and then removing all acid and salts adhering to said crystals.

6. A process for the production of a high purity abrasive material, which consists in furnacing a charge of bauxite with an excess of carbon to reduce substantially all the oxides of silicon, iron, titanium and a small percentage of alumina, then cooling said fused mass and forming a high purity crystalline alumina imbedded in a matrix of acid-decomposable character, said character being a result of the excess of said carbon in the charge, then crushing and separating granular crystalline alumina from the fused mass, and then subjecting said crushed material to the dissolving action of a warm bath of mixed hydrofluoric and sulphuric acids.

7. A process for the production of a high purity abrasive material, which consists in furnacing a charge of bauxite with an excess of carbon to reduce substantially all the oxides of silicon, iron, titanium and a small percentage of alumina, then cooling said fused mass and forming a high purity crystalline alumina imbedded in a matrix of acid-decomposable character, said character being a result of the excess of said carbon in the charge, then crushing and separating granular crystalline alumina from the fused mass, then subjecting said crushed granular material to the dissolving action of a warm dilute acid bath containing a mixture of approximately 6% hydrofluoric and 16% sulphuric acid.

In testimony whereof we affix our signatures.

JACOB S. MASIN.
HAROLD E. WHITE.